US008931966B2

(12) United States Patent
Chiu et al.

(10) Patent No.: US 8,931,966 B2
(45) Date of Patent: Jan. 13, 2015

(54) TRIPLEXER AND/OR OPTICAL LINE TERMINAL COMPATIBLE WITH A 10G ETHERNET PASSIVE OPTICAL NETWORK AND A HOUSING THEREFOR

(75) Inventors: Chien-Hsiung Chiu, Chengdu (CN); Hung-Yuan Chen, Chengdu (CN); Chih-Lung Nien, Chengdu (CN); Che-Jen Chang, Chengdu (CN); Shih-Pin Ko, Chengdu (CN); Pei-Keng Fu, Chengdu (CN); Tsai-Wei Chen, Chengdu (CN)

(73) Assignee: Source Photonics, Inc., Chatsworth, CA (US)

( * ) Notice: Subject to any disclaimer, the term of this patent is extended or adjusted under 35 U.S.C. 154(b) by 313 days.

(21) Appl. No.: 13/341,306

(22) Filed: Dec. 30, 2011

(65) Prior Publication Data

US 2013/0105672 A1 May 2, 2013

(30) Foreign Application Priority Data

Oct. 28, 2011 (CN) .......................... 2011 1 0335254

(51) Int. Cl.
*G02B 6/36* (2006.01)
*H04B 10/40* (2013.01)
*G02B 6/42* (2006.01)
*G02B 6/28* (2006.01)

(52) U.S. Cl.
CPC .............. *H04B 10/40* (2013.01); *G02B 6/4246* (2013.01); *G02B 6/2817* (2013.01)
USPC .................... 385/93; 385/53; 385/88; 385/92; 385/94

(58) Field of Classification Search
USPC .................................... 385/53, 88, 92, 93, 94
See application file for complete search history.

(56) References Cited

U.S. PATENT DOCUMENTS

| 8,025,444 | B2 * | 9/2011 | Choi et al. ....................... 385/88 |
| 2009/0016678 | A1 * | 1/2009 | Kawamura et al. ............. 385/33 |
| 2013/0022313 | A1 * | 1/2013 | Chen et al. ....................... 385/31 |
| 2013/0051024 | A1 * | 2/2013 | Amit ............................ 362/259 |

OTHER PUBLICATIONS

Chien-Hsiung Chiu, Shih-Pin Ko and Hung-Yuan Chen; "Bi-Directional Fiber Optic Transceivers, Housings Therefor, and Methods for Making and Using the Same"; U.S. Appl. No. 13/341,260, filed Dec. 30, 2011.
Hung-Yuan Chen, E-Min Chou, Chin-Hao Fu and Chih-Lung Nien; Optical Devices and Methods of Making and Using the Same; U.S. Appl. No. 13/339,874, filed Dec. 29, 2011.

* cited by examiner

*Primary Examiner* — Jennifer Doan
(74) *Attorney, Agent, or Firm* — Andrew D. Fortney; Central California IP Group, P.C.

(57) ABSTRACT

An optical triplexer and/or optical line terminal (OLT) compatible with 1.25 and 10 Gb/s passive optical networks is disclosed. The triplexer/OLT includes an optical fiber, first and second laser diodes, a photodiode, and first and second lenses. A hemispherical lens may be at an end face of the photodiode or receiver subassembly housing. A first optical splitter is mounted between the first and second lenses, and a second optical splitter is mounted between the optical fiber and the second laser diode. The first lens and first laser diode, and the second lens and second laser diode share respective common linear optical axes. The present triplexer/OLT advantageously accords with an interface standard IEEE802.3av-2009 PRX30. In addition, the present triplexer can advantageously implement analog receiving and digital transceiving, save optical fiber resources, and provide high efficiency coupling. Thus, requirements for high power output and smaller housing outlines can be served.

20 Claims, 3 Drawing Sheets

US 8,931,966 B2

TRIPLEXER AND/OR OPTICAL LINE TERMINAL COMPATIBLE WITH A 10G ETHERNET PASSIVE OPTICAL NETWORK AND A HOUSING THEREFOR

CROSS REFERENCE TO RELATED APPLICATION

This application claims the benefit of Chinese Patent Application No. 201110335254.5, which was filed on Oct. 28, 2011, and is incorporated by reference as if fully set forth herein.

FIELD OF THE INVENTION

The present invention generally relates to the field of fiber optic transceivers, triplexers, and/or optical line terminals (OLTs) compatible with passive optical networks (e.g., a PRX30 10G EPON).

DISCUSSION OF THE BACKGROUND

With the combination of a relatively simple and economic Ethernet and the transmission architecture of a passive optical network (PON), Ethernet passive optical networks (EPONs) transmit various services via a single Ethernet. An EPON is capable of realizing video broadcast transmissions by expanding use of a third wavelength. With the promotion and popularization of FTTX, home HD interactive TV programs, telemedicine, remote education, and other high-speed broadband services are increasingly becoming a significant part of people's personal lives and work. As the demand for broadband services increase, the current 1G EPON will not be sufficient to meet the requirements for broadband services.

Therefore, a 10G EPON capable of providing greater bandwidth becomes an attractive solution, and a 10G EPON optical line terminal (OLT) transceiver is an important part of that system. In the transition from 1.25 Gb/s to 10 Gb/s, the two rates must be compatible in certain networks, so an OLT or transceiver compatible with these rates will help to meet the market demand.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention provides a PRX30 10G EPON-compatible optical triplexer and/or optical line terminal (OLT), and a housing for the triplexer and/or OLT. The triplexer comprises an optical fiber, a first laser diode, a second laser diode, a photodiode, a first lens, and a second lens. The triplexer is characterized as being compatible with 1.25 Gb/s and 10 Gb/s networks. In addition, the triplexer advantageously has (i) a smaller housing outline, (ii) a higher efficiency in coupling, and (iii) the capability of serving requirements for high power output.

In order to implement such purposes, the present triplexer includes an optical fiber, a first laser diode, a second laser diode, a photodiode, first and second lenses, a first optical splitter between the first and second lenses, and a second optical splitter between the optical fiber and the second laser diode. The first lens and the first laser diode share a first common linear optical axis, and the second lens and the second laser diode share a second common linear optical axis.

According to various embodiments of the present invention, the first optical splitter is plated or coated with a reflection increasing film and an anti-reflection film, and the second optical splitter is plated or coated with a reflection increasing film. A surface of the first optical splitter that corresponds to the second laser diode may be plated or coated with the anti-reflection film, and a surface that corresponds to the first laser diode may be plated or coated with the reflection increasing film. A surface of the second optical splitter that corresponds to the photodiode may be plated or coated with the reflection increasing film.

According to further embodiments of the present invention, the first optical splitter and second optical splitter are at an angle (e.g., a 45° angle) in the optical path defined by the second linear optical axis described above.

According to one embodiment of the present invention, the first lens is a first aspheric lens, and the second lens is a second spherical lens. The first laser diode may be placed at a focal point of the first aspheric lens, and the second laser diode may be placed at a focal point of the second spherical lens. A flat surface of the first aspheric lens can be horizontally mounted on one side of the first optical splitter, and the second spherical lens can be mounted on an opposite side of the first optical splitter. In such an embodiment, the second optical splitter may be mounted between the first optical splitter and the optical fiber, without contacting the first optical splitter.

According to another embodiment of the present invention, the first lens is a spherical lens, and the second lens is an aspheric lens. In this embodiment, the first laser diode may be placed at the focal point of the first spherical lens, and the second laser diode may be placed at the focal point of the second aspheric lens. The first spherical lens can be mounted on one side of the first optical splitter, and the second aspheric lens can have a flat surface that is horizontally mounted on the opposite side of the first optical splitter. In such an embodiment, the second optical splitter may be mounted between the first optical splitter and the optical fiber, optionally in contact with the first optical splitter.

The present invention further provides a housing for the triplexer and/or OLT, comprising a first laser diode mounting hole, a second laser diode mounting hole, a photodiode mounting hole, an optical fiber mounting hole, and an internal cavity corresponding to the first lens, the first optical splitter, the second optical splitter, and the second lens. Furthermore, the cavity may have an upper wall that has bearing slots compatible with upper ends of the first and second optical splitters. According to a further embodiment, a lower wall of the cavity has second bearing slots compatible with lower ends of the first and second optical splitters. The lower wall of the cavity may also have a first bearing slot or depression compatible with the second lens.

The present invention further provides a method of utilizing the above-mentioned housing (e.g., in making the transceiver or OLT), comprising orienting or placing the first and second optical splitters at an angle in the first and/or second bearing slots of the cavity (e.g., via the first and/or the second laser diode mounting hole[s]), and adhering the upper and lower ends of the first and second optical splitters to the housing using a first adhesive; placing and/or positioning the first (aspheric) lens in the cavity via the first laser diode mounting hole, leveling any flat surface of the first aspheric lens, and adhering ends of the first aspheric lens to the housing using a second adhesive, which may be the same as or different from the first adhesive; and placing and/or positioning the second (spherical) lens in the first bearing slot/depression on the lower wall of the cavity via the second laser diode mounting hole, and adhering the second spherical lens to the housing (e.g., using a third adhesive, which may be the same as or different from the first and/or second adhesives).

The present invention further provides a housing for the above-mentioned triplexer and/or OLT, comprising a first laser diode mounting hole, a second laser diode mounting hole, a photodiode, an optical fiber mounting hole, and a cavity corresponding to the first optical splitter, the second optical splitter, the first (spherical) lens and the second (aspheric) lens, wherein a side wall of the cavity has a first bearing slot or depression compatible with the first lens. According to one embodiment of the present invention, the upper and lower walls of the cavity have second bearing slots or depressions compatible with the upper and lower ends of the first and second optical splitters.

The present invention further provides a method of utilizing the above-mentioned housing (e.g., in making the transceiver or OLT), comprising placing or orienting the first and second optical splitters at an angle in the second bearing slots of the cavity via the second laser diode mounting hole; adhering the upper and lower ends of the first and second optical splitters to the housing using a first adhesive; placing and/or positioning the first (spherical) lens in the first bearing slot or depression of the cavity via the first laser diode mounting hole, and adhering an end of the first (spherical) lens to the housing using a second adhesive; and placing and/or positioning the second (aspheric) lens in the cavity via the second laser diode mounting hole, leveling any flat surface of the second (aspheric) lens, and adhering the ends of the second aspheric lens to the housing using a third adhesive.

Relative to existing technologies, the present invention is advantageous for the following reasons:

1) The present triplexer is compatible with 1.25 Gb/s and 10 Gb/s networks, and accords with the interface standard IEEE802.3av-2009 PRX30. The triplexer can implement analog receiving and digital transceiving. Also, the triplexer saves optical fiber resources and has high efficiency in coupling. Thus, requirements for high power output and smaller outline (e.g., for synchronous housing) can be served.
2) Any high power output requirements can be served by utilizing an aspheric lens with high coupling in the present invention.
3) With a spherical lens capable of extending the focal length, and the cooperation of an aspheric lens and a spherical lens, a laser diode or transmitter optical assembly in an individual housing can be enabled to couple triplexer components in a smaller housing in such transceiver or OLT products.

These and other advantages of the present invention will become readily apparent from the detailed description of various embodiments below.

DETAILED DESCRIPTION

The present invention will become readily apparent from the detailed description of embodiments and drawings below.

Reference will now be made in detail to various embodiments of the invention, examples of which are illustrated in the accompanying drawings. In order to achieve the objectives, technical solutions and advantages of the present invention more clearly, further details of the invention are described below with regard to the Figures. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. The embodiments described here are only used to explain, rather than limit, the invention.

For the sake of convenience and simplicity, the terms "optical signal" and "light" may be used interchangeably, as may the terms "connected to," "coupled with," "coupled to," and "in communication with" (which terms also refer to direct and/or indirect relationships between the connected, coupled and/or communicating elements unless the context of the term's use unambiguously indicates otherwise), but these terms are generally given their art-recognized meanings.

Furthermore, all characteristics, measures or processes disclosed in this document, except characteristics and/or processes that are mutually exclusive, can be combined in any manner and in any combination possible. Any characteristic disclosed in the present specification, claims, Abstract and/or figures can be replaced by other equivalent characteristics or characteristics with similar objectives, purposes and/or functions, unless specified otherwise. Each characteristic is generally only an embodiment of the invention disclosed herein.

Figure 2:
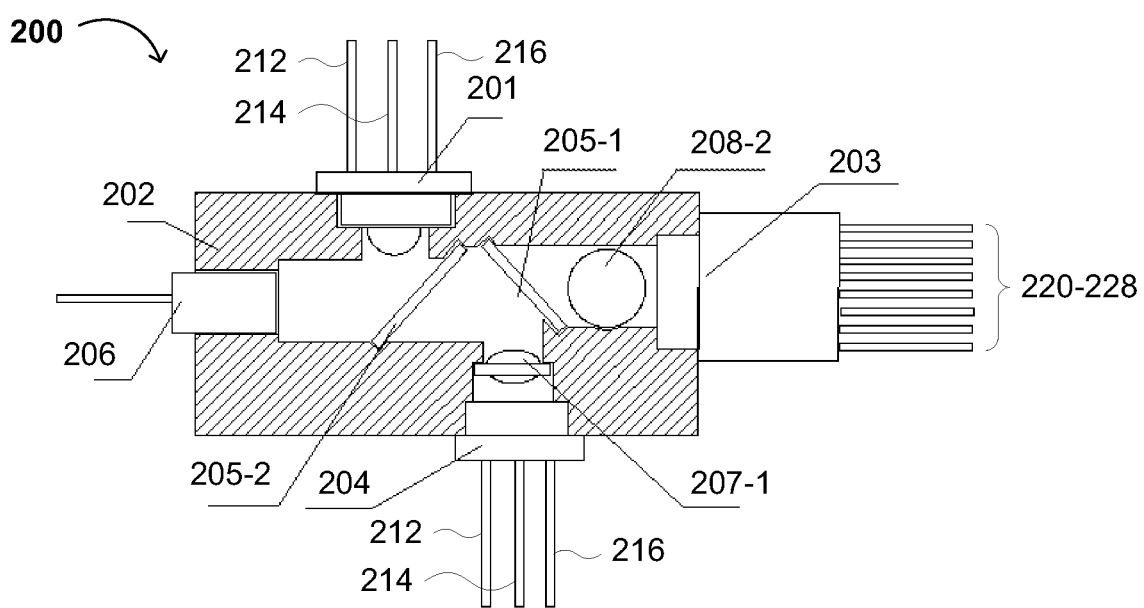
FIG. 2 is a diagram showing a first exemplary embodiment of the present invention.

Referring to FIG. 2, the present invention provides a PRX30 10G EPON-compatible triplexer and/or optical line terminal (OLT) 200, comprising a first laser diode 204, a second laser diode 203, a first optical splitter 205-1, a second optical splitter 205-2, a photodiode 201, an optical fiber 206, and first and second lenses 207-1 and 208-2 that respectively flank the first optical splitter 205-1. The second optical splitter 205-2 is mounted between the optical fiber 206 and the second laser diode 203. A surface of the first optical splitter 205-1 that corresponds to or faces the second laser diode 203 may be plated or coated with an anti-reflection film. Thus, reflected optical energy is decreased, and transmission optical energy is increased proportionally. Furthermore, a second surface of the first optical splitter 205-1 that corresponds to or faces the first laser diode 204 is plated or coated with a reflection increasing film, and a surface of the second optical splitter 205-2 that corresponds to or faces the photodiode 201 is plated or coated with the same or different reflection increasing film. The reflection increasing films work in a way contrary to that in which the transmission increasing films generally work, such that incident light is reflected by either surface of the reflection increasing film and is enhanced. Thus, transmission light fades so that transmission optical energy is decreased and reflected optical energy is increased.

Generally, the anti-reflection coating film can be selected from $MgF_2$, $TiO_2$, ceramic IR transmission increasing films, certain vinyl-substituted silsesquioxane hybrid membranes, etc. Typically, the reflection coating film can be selected from zinc chalcogenides, such as ZnSe, ZnS, and ZnO, possibly other vinyl-substituted silsesquioxane hybrid membranes, etc. Conventional film coating methods include vacuum evaporation, chemical vapor deposition, sol-gel coating, etc. Sol-gel coating advantageously uses less expensive apparatus and/or less equipment, and it can be operated at ambient temperatures and pressures. In addition, sol-gel coating advantageously provides high uniformity of coating, a controllable microstructure, an optical thin film with a high laser damage threshold (e.g., via recipe and preparation process control), and compatibility with substrates of different shapes and sizes. In the present invention, both the first optical splitter 205-1 and the second optical splitter 205-2 are coated by sol-gel coating.

The first lens 207-1 and the first laser diode 204 share a common liner optical axis, and the second lens 208-2 and the second laser diode 203 share a common liner optical axis. Therefore, the longitudinal dimension of a transceiver can be decreased, and signal transmission in the optical path can be optimized with the lowest optical loss.

Furthermore, each of the first and second lenses may be a spherical lens or an aspheric lens.

The process for forming the spherical (or hemispherical) lens in accordance with the present invention includes: (1) rounding off the edges of a cube which subsequently becomes a spheroid; (2) placing the spheroid in a grinder (e.g., a ball grinder or other grinder) for rough grinding, and subsequently adding grinding materials to the grinder so that the spheroids can be ground further (e.g., based on requirements of a grinder having plates with homocentric slots to accommodate the spheroids, which run in relative motion); and (3) polishing the spheroids (e.g., glass balls) with a flexible polishing mould that can change its surface shape in accordance with the finished surface of the spheroid so as to decrease the roughness of the surface of the spheroid, instead of changing the surface shape of the finished surface.

The process for forming the aspheric lens in accordance with the present invention includes: (1) melting a piece of an optical glass, pouring the optical glass in its molten state in to a compression mold made from a special material conventionally used for such a purpose, heating the glass and mold up to the softening point of the glass in absence of oxygen, and then conventionally pressing the glass in the mold while the glass and mold are at approximately the same temperature; and (2) subsequently, applying constant pressure (e.g., to the glass in the mold) and cooling the mold to a temperature below the softening point of the glass, and then removing the formed aspheric lens from the mold.

Figure 1:
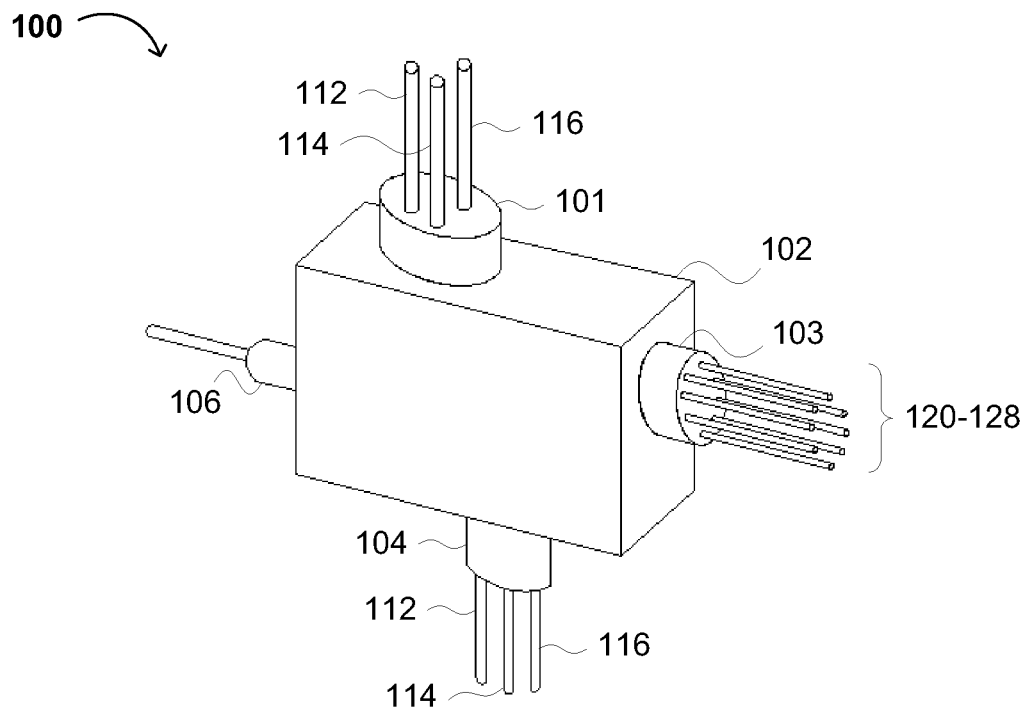
FIG. 1 is a diagram showing an external portion (e.g., outline) of an embodiment of the present invention.

Referring to FIGS. 1 and 2, FIG. 1 shows an external portion of a PRX30 10G EPON-compatible triplexer, and FIG. 2 shows an exemplary embodiment of the triplexer comprising a first aspheric lens 207-1, a second spherical lens 208-2, a photodiode 101 of FIGS. 1 and 201 of FIG. 2, a first optical splitter 205-1 and a second optical splitter 205-2. Each of the photodiode 101 of FIG. 1 and 201 of FIG. 2 and the first laser diode 104 of FIG. 1 and 204 of FIG. 2 are fitted with four pins, a power supply pin 212, a ground pin 214, a data pin 216, and a complementary data pin (not shown). The second laser diode 103 of FIG. 1 and 203 of FIG. 2 is fitted with a plurality of pins 120-128 (FIG. 1) or 220-228 (FIG. 2).

An end face of the photodiode 201 (or internal surface of the receiver subassembly) has a hemispherical shape, which may comprise a focusing lens. The first optical splitter 205-1 has a 120-degree angle with regard to the optical path, and the second optical splitter 205-2 has a 45-degree angle with regard to an axis between the first optical splitter 205-1 and the optical fiber 206. The first optical splitter 205-1 does not physically or directly contact the second optical splitter 205-2. The flat surface of the first aspheric lens 207-1 is horizontally mounted on one side of the first optical splitter 205-1, and the second spherical lens 208-2 is mounted on the other side of the first optical splitter 205-1. The first laser diode 204 is placed at a focal point of the first aspheric lens 207-1, and the second laser diode 203 is placed at a focal point of the second spherical lens 208-2.

Figure 4:
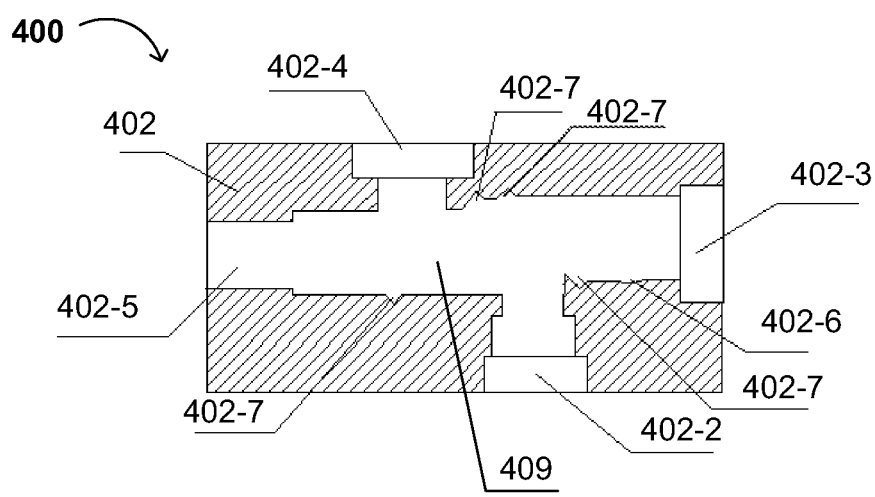
FIG. 4 is a diagram showing an exemplary housing in accordance with the embodiment of FIG. 2 of the present invention.

FIG. 4 is a diagram showing the housing in accordance with the embodiment of FIG. 2. A housing 202 of FIG. 2 or 402 of FIG. 4 for the PRX30 10G EPON-compliant triplexer or OLT comprises a first laser diode mounting hole 402-2, a second laser diode mounting hole 402-3, a photodiode mounting hole 402-4, and an optical fiber mounting hole 402-5. In the housing 402, there is a cavity 409 corresponding to (or in which is placed) the first optical splitter 205-1 of FIG. 2, the second optical splitter 205-2 of FIG. 2, the first aspheric lens 207-1 of FIG. 2, and the second spherical lens 208-2 of FIG. 2. The lower wall of cavity 409 has a first bearing slot or depression 402-6 compatible with the second spherical lens 208-2 of FIG. 2, which is secured at least in part by the first bearing slot or depression 402-6. The upper and lower walls of the cavity 409 have second bearing slots 402-7 compatible with the upper and lower ends of the first optical splitter 205-1 of FIG. 2 and the second optical splitter 205-2 of FIG. 2, which are secured at least in part by the second bearing slots 402-7. Thus, a lower surface of an inclined first optical splitter 205-1 of FIG. 2 is enabled or configured to face the first laser diode 204 of FIG. 2, and an upper surface of the inclined first optical splitter 205-1 of FIG. 2 is enabled or configured to face the second laser diode 203 of FIG. 2. An upper surface of an inclined second optical splitter 205-2 of FIG. 2 is enabled or configured to face the photodiode 201 of FIG. 2 and the optical fiber 206 of FIG. 2, and a lower surface of the inclined second optical splitter 205-2 of FIG. 2 is enabled or configured to face the first laser diode 204 of FIG. 2.

A method utilizing the housing 402 (e.g., to make the transceiver or OLT) comprises orienting or placing the second optical splitters 208-2 of FIG. 2 at an 45-degree angle in the optical path, orienting or placing the first optical splitter 205-1 of FIG. 2 at an 120-degree angle in the optical path in the second bearing slots 402-7 of the cavity 409, using (e.g., inserting the optical splitter through) the second laser diode mounting hole 402-3. Alternatively, the first optical splitter 205-1 of FIG. 2 is configured through the first laser diode mounting hole 402-2, and the second optical splitter 205-2 of FIG. 2 is configured through the photodiode mounting hole 402-4. The upper and lower ends of the first and second optical splitters 205-1, 205-2 of FIG. 2 can be adhered to the housing 202 of FIG. 2 or 402 of FIG. 4 using a first adhesive. Subsequently, the method comprises placing the first aspheric lens 207-1 in the cavity 409 via the first laser diode mounting hole 402-2, leveling the flat surface of the first aspheric lens 207-1, and then adhering the periphery (e.g., opposite ends) of first aspheric lens 207-1 to the housing 402 using a second adhesive, which may be the same as or different from the first adhesive. Next, the second spherical lens 208-2 of FIG. 2 is placed in the first bearing slot or depression 402-6 on the lower wall of the cavity 409 then the second laser diode mounting hole 402-3, and the second spherical lens 208-2 of FIG. 2 is adhered (e.g., by its lower end) to the housing 402 using a third adhesive. The third adhesive may be same as or different from the first and/or second adhesives.

Figure 3:
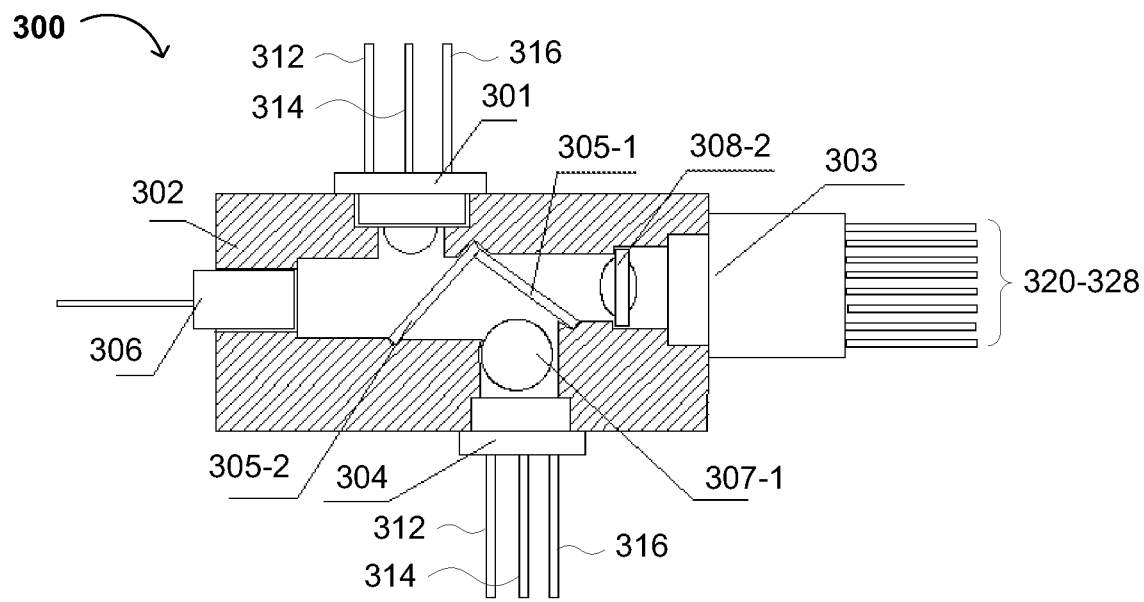
FIG. 3 is a diagram showing a second exemplary embodiment of the present invention.

Referring to FIGS. 1 and 3, FIG. 3 shows another exemplary embodiment of the PRX30 10G EPON-compatible triplexer and/or OLT, comprising a first spherical lens 307-1 and a second aspheric lens 308-2, a photodiode 101 of FIG. 1 or 301 of FIG. 3, a first optical splitter 305-1, and a second optical splitter 305-2. Each of the photodiode 101 of FIG. 1 or 301 of FIG. 3 and the first laser diode 104 of FIG. 1 or 304 of FIG. 3 are fitted with four pins, a power supply pin 312, a ground pin 314, a data pin 316, and a complementary data pin (not shown). The second laser diode 103 of FIG. 1 or 303 of FIG. 3 is fitted with a plurality of pins 120-128 (FIG. 1) or 320-328 (FIG. 3).

An end face of the photodiode 301 (or internal surface of the receiver subassembly) has a hemispherical shape, which may comprise a focusing lens. The first optical splitter 305-1 has a 135-degree angle with regard to the optical path, and a second optical splitter 305-2 has a 45-degree angle with regard to an axis between the first optical splitter 305-1 and the optical fiber 306. An upper end of the first optical splitter 305-1 may be in direct and/or physical contact with the second optical splitter 305-2. A flat surface of the first aspheric lens 307-1 is vertically mounted on one side of the first optical splitter 305-1, and the second spherical lens 308-2 is mounted on the other side of the first optical splitter 305-1. The first laser diode 304 is placed at a focal point of the first spherical lens 307-1, and the second laser diode 303 is placed at a focal point of the second aspheric lens 308-2.

Figure 5:
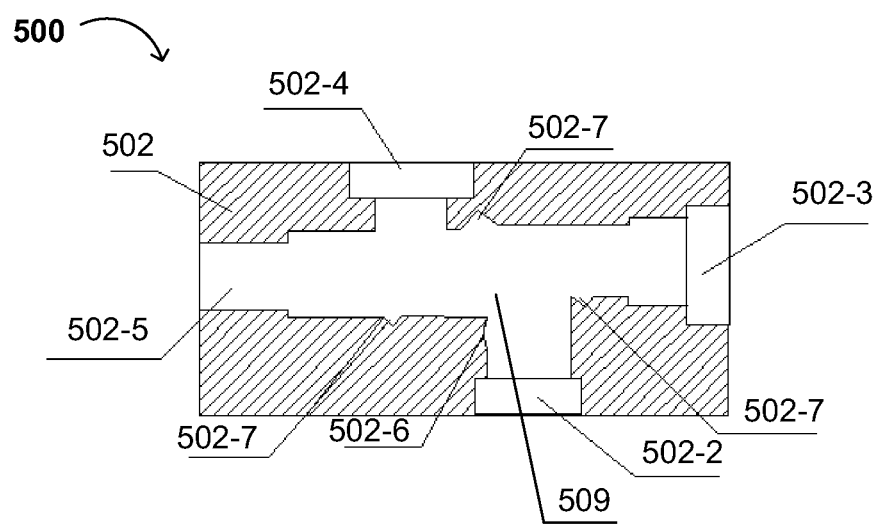
FIG. 5 is a diagram showing an exemplary housing in accordance with the embodiment of FIG. 3 of the present invention.

FIG. 5 is a diagram showing the housing in accordance with the embodiment of FIG. 3. A housing 302 of FIG. 3 or 502 of FIG. 5 for the PRX30 10G EPON-compatible triplexer or OLT comprises a first laser diode mounting hole 502-2, a second laser diode mounting hole 502-3, a photodiode mounting hole 502-4, and an optical fiber mounting hole 502-5. In the housing 502, there is a cavity 509 corresponding to (or in which is placed) the first optical splitter 305-1 of FIG. 3, the second optical splitter 305-2 of FIG. 3, the first spherical lens 307-1 of FIG. 3, and the second aspheric lens 308-2 of FIG. 3. One side of the cavity 509 has a first bearing slot or depression 502-6 compatible with the second spherical lens 307-1 of FIG. 3, which is secured at least in part by the first bearing slot or depression 502-6. The upper and lower walls of the cavity 509 have second bearing slots 502-7 compatible with the upper and lower ends of the first optical splitter 305-1 of FIG. 3 and the second optical splitter 305-2 of FIG. 3, which are secured at least in part by the second bearing slots 502-7. Thus, a lower surface of an inclined first optical splitter 305-1 of FIG. 3 is enabled or configured to face the first laser diode 304 of FIG. 3, and an upper surface of the inclined first optical splitter 305-1 of FIG. 3 is enabled or configured to face the second laser diode 303 of FIG. 3. An upper surface of an inclined second optical splitter 305-2 of FIG. 3 is enabled or configured to face the photodiode 301 of FIG. 3 and the optical fiber 306 of FIG. 3, and a lower surface of the inclined second optical splitter 305-2 of FIG. 3 is enabled or configured to face the first laser diode 304 of FIG. 3.

A method utilizing housing 502 (e.g., to make the transceiver or OLT) comprises orienting or placing the second optical splitters 305-2 of FIG. 3 at an 45-degree angle in the optical path, orienting or placing the first optical splitter 305-1 of FIG. 3 at an 135-degree angle in the optical path in second bearing slots 302-7 of FIG. 3 of the cavity 509, using (e.g., inserting the optical splitter[s] through) the second laser diode mounting hole 502-3. Alternatively, the first optical splitter 305-1 of FIG. 3 is configured through the first laser diode mounting hole 502-2, and the second optical splitter 305-2 of FIG. 3 is configured through the photodiode mounting hole 502-4. The upper and lower ends of the first and second optical splitters 305-1, 305-2 of FIG. 3 can be adhered to the housing 502 using a first adhesive. Subsequently, the method comprises placing the second aspheric lens 308-2 of FIG. 3 in the cavity 509 via the second laser diode mounting hole 502-3, leveling a flat surface of the second aspheric lens 308-2 of FIG. 3, and then adhering the periphery (e.g., opposite ends) of the second aspheric lens 308-2 of FIG. 3 to the housing 502 using a second adhesive, which may be the same as or different from the first adhesive. Next, the first spherical lens 307-1 of FIG. 3 is placed in the first bearing slot or depression 502-6 on the side wall of the cavity 509 through the first laser diode mounting hole 502-2, and adhering a side wall of the first spherical lens 308-2 of FIG. 3 to the housing 502 using a third adhesive. The third adhesive may be same as or different from the first and/or second adhesives.

CONCLUSION/SUMMARY

Thus, the present invention provides a PRX30 10G EPON-compatible triplexer and/or optical line terminal (OLT). The triplexer comprises an optical fiber, a first laser diode, a second laser diode, a photodiode, a first lens, and a second lens. A first optical splitter is mounted between the first and second lenses, and a second optical splitter is mounted between the optical fiber and the second laser diode. In addition, the first lens and the first laser diode share a first common linear optical axis, and the second lens and the second laser diode share a second common linear optical axis.

The present PRX30 10G EPON-compatible triplexer and/or OLT is advantageously compatible with 1.25 Gb/s and 10 Gb/s networks or protocols, and accords with an interface standard IEEE802.3av-2009 PRX30. In addition, the present triplexer can advantageously implement analog receiving and digital transceiving. The triplexer further advantageously saves optical fiber resources and provides high efficiency coupling. Thus, requirements for high power output and smaller housing outlines for can be served.

The foregoing descriptions of specific embodiments of the present invention have been presented for purposes of illustration and description, and many modifications and variations are possible in light of the above teachings. The descriptions are not intended to limit the invention to the above described embodiments. On the contrary, the invention is intended to cover new feature or any combination thereof, as well as steps of any new method or procedure, or any new combination thereof that may be included within the spirit and scope of the specification. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:
1. An optical triplexer, comprising:
an optical fiber;
first and second laser diodes;
a photodiode or receiver subassembly having a hemispherical end face;
first and second lenses;

a first optical splitter, at least part of which is in a space directly between said first and second lenses; and a second optical splitter between said optical fiber and said second laser diode, wherein said first lens and said first laser diode share a first common linear optical axis, and said second lens and said second laser diode share a second common linear optical axis.

2. An optical triplexer, comprising:

an optical fiber;

first and second laser diodes;

a photodiode or receiver subassembly having a hemispherical end face;

first and second lenses;

a first optical splitter between said first and second lenses; and a second optical splitter between said optical fiber and said second laser diode, wherein a first surface of said first optical splitter that corresponds to said second laser diode has an anti-reflection film thereon, a second surface of said first optical splitter has a first reflection increasing film thereon, and said second optical splitter has a second reflection increasing film thereon.

3. The triplexer of claim 1, wherein a first surface of said first optical splitter that corresponds to said second laser diode has the anti-reflection film thereon, and a second surface that corresponds to the first laser diode has the first reflection increasing film thereon.

4. The triplexer of claim 2, wherein a surface of said second optical splitter that corresponds to the photodiode has a second reflection increasing film thereon.

5. The triplexer of claim 2, wherein each of said first optical splitter and said second optical splitter have a predetermined angle with regard to an optical path between said second laser diode and said optical fiber.

6. The optical triplexer of claim 1, wherein said first lens comprises an aspheric lens, and said second lens comprises a spherical lens.

7. The triplexer of claim 6, wherein said first laser diode is at a focal point of the aspheric lens, and said second laser diode is at a focal point of the spherical lens.

8. The triplexer of claim 7, wherein said aspheric lens is on a first side of said first optical splitter and has a flat surface in parallel with an optical path between said second laser diode and said optical fiber, and said spherical lens is on an opposite side of said first optical splitter.

9. The triplexer of claim 8, wherein said second optical splitter is between said first optical splitter and said optical fiber, without being in contact with said first optical splitter.

10. An optical triplexer, comprising:

an optical fiber;

first and second laser diodes;

a photodiode or receiver subassembly having a hemispherical end face;

first and second lenses;

a first optical splitter between said first and second lenses; and a second optical splitter between said optical fiber and said first optical splitter, and said second optical splitter is in contact with said first optical splitter, wherein said first lens comprises a spherical lens, and said second lens comprises an aspheric lens.

11. The triplexer of claim 10, wherein said first laser diode is at a focal point of said spherical lens, and said second laser diode is at said focal point of the aspheric lens.

12. The triplexer of claim 10, wherein said spherical lens is on a first side of said first optical splitter, and said aspheric lens is on a second side of said first optical splitter and has a flat surface perpendicular to an optical path between said second laser diode and said optical fiber.

13. The triplexer of claim 1, wherein said second optical splitter is between said first optical splitter and said optical fiber, and said second optical splitter is in contact with said first optical splitter.

14. A housing for an optical triplexer, comprising:

a first laser diode mounting hole;

a second laser diode mounting hole;

a photodiode mounting hole;

an optical fiber mounting hole; and an internal cavity corresponding to a first lens, a first optical splitter, a second optical splitter, and a second lens, wherein said cavity comprises an upper wall having bearing slots compatible with upper ends of said first and second optical splitters.

15. The housing of claim 14, wherein said cavity comprises a lower wall having additional bearing slots compatible with lower ends of the first and second splitters.

16. The housing of claim 14, wherein the lower wall of said cavity comprises a first bearing slot or depression compatible with the second lens.

17. A method of making an optical triplexer, comprising:

placing first and second optical splitters at an angle in bearing slots in a cavity in the optical triplexer through a laser diode mounting hole in a housing of the optical triplexer;

adhering upper and lower ends of the first and second optical splitters to the housing using a first adhesive;

positioning an aspheric lens in the cavity via a same or different laser diode mounting hole in the housing;

leveling a flat surface of the aspheric lens;

adhering the aspheric lens to the housing using a second adhesive;

positioning a spherical lens in a first bearing slot or depression on a lower wall of the cavity through a laser diode mounting hole other than that through which the aspheric lens was positioned; and adhering the spherical lens to the housing.

18. A housing for an optical triplexer, comprising:

a first laser diode mounting hole;

a second laser diode mounting hole;

a photodiode mounting hole;

an optical fiber mounting hole; and a cavity corresponding to a first optical splitter, a second optical splitter, a spherical lens and an aspheric lens, wherein a side wall or a lower wall of said cavity has a first bearing slot or depression compatible with the spherical lens.

19. The housing of claim 18, wherein said cavity has upper and lower walls with second bearing slots compatible with upper and lower ends of the first and second optical splitters.

20. The optical triplexer of claim 1, wherein said first optical splitter has (i) a first surface that corresponds to said second laser diode with an anti-reflection film thereon and (ii) a second surface that corresponds to the first laser diode with a first reflection increasing film thereon, and said second optical splitter has a second reflection increasing film thereon.

* * * * *